T. J. GOODRUM.
PEANUT HARVESTER.
APPLICATION FILED MAR. 31, 1919.
1,358,539.
Patented Nov. 9, 1920.
2 SHEETS—SHEET 1.
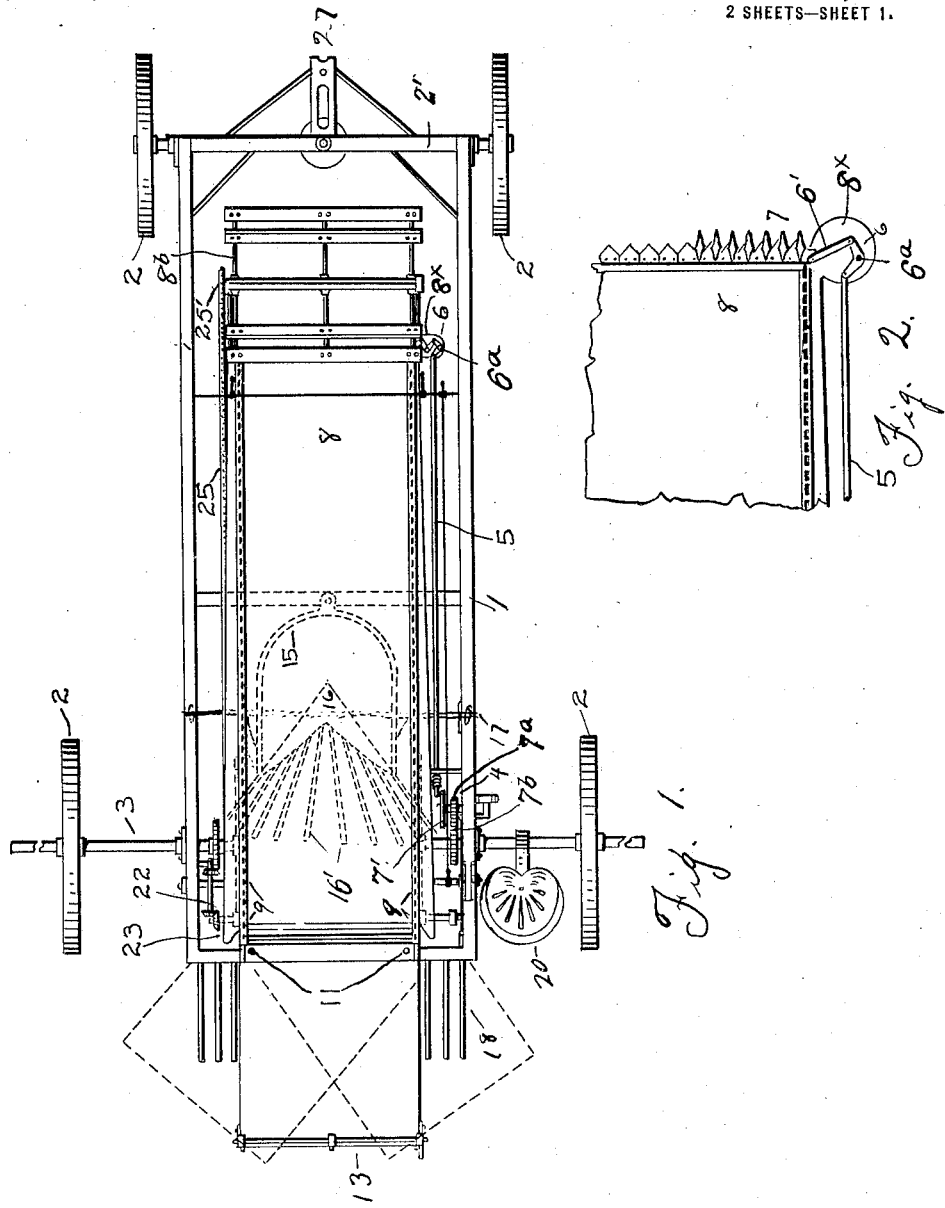
WITNESS:
Mrs. Laura L. Goodrum.
INVENTOR.
Thomas J. Goodrum.
BY
ATTORNEY.

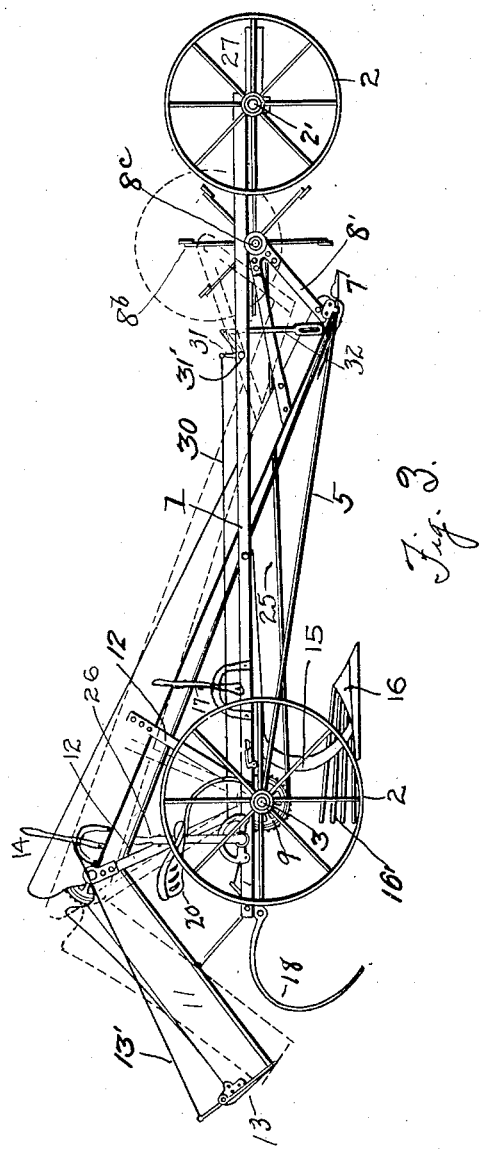

UNITED STATES PATENT OFFICE.

THOMAS J. GOODRUM, OF HOUSTON, TEXAS.

PEANUT-HARVESTER.

1,358,539.  Specification of Letters Patent.  Patented Nov. 9, 1920.

Application filed March 31, 1919. Serial No. 286,611.

*To all whom it may concern:*

Be it known that I, THOMAS J. GOODRUM, a citizen of the United States, residing at Houston, county of Harris, State of Texas, have invented a certain Improvement in Peanut-Harvesters, of which the following is a specification.

This invention relates to new and useful improvements in peanut harvesters, and comprises a simple and efficient apparatus of this nature, having various details of construction combination and arrangement of parts which will be hereinafter fully described, shown in the accompanying drawings and then specifically defined in the appended claim.

My invention is illustrated in the accompanying drawings which, with the numerals of reference marked thereon, form a part of this application and in which:

Figure 1 is a top plan view.

Fig. 2 is an enlarged detail plan view, and

Fig. 3 is a side elevation, parts being removed to better illustrate features of the invention.

Reference now being had to the details of the drawings by numerals:

1 designates the frame of the apparatus, having a forward axle 2' and a rear axle 3, with wheels 2 mounted upon said axles, those upon the latter rotating with the axle 3.

A reciprocating sickle bar 7 is pivotally connected to the angle lever 6 through the medium of the link 6', said angle lever being pivoted at $6^a$ upon a projection $8^x$ of the platform 8. A rod 5 is pivotally connected to one end of the angle lever 6 and its other end is pivoted to a pin upon an eccentric 7' which has a shaft with gear wheel $7^a$ thereon, which is in mesh with a gear wheel $7^b$ fastened to the axle 3.

A plow 16 is mounted upon a yoke 15 which is secured to the frame and the lever 17 affords means for raising and lowering the plow. Said plow is provided with rearwardly extending sifter fingers 16', whereby the dirt may be sifted from the peanut harvester and plowed up. Upon the rear end of the frame is mounted a shocker 11 which has a gate 13 at its rear end connected by a rod 13' to the operating lever 14.

Said platform 8, which carries the sickle bar, has arms 12 at its rear end, which are pivoted at their lower ends upon the axle 3, and is raised and lowered through the medium of the operating lever 26 secured thereto. The forward portion of the platform has bracket arms 8' which support a shaft $8^c$ carrying a wheel comprising radial wings $8^b$ which are adapted to throw the vines of the peanuts back over the forward end of the platform carrying the sickle bar. A sprocket wheel 25' is fixed to the shaft $8^c$ over which, and a sprocket wheel 9 upon the axle 3, a sprocket chain 25 passes, which forms means for rotating the wheel having said radial wings.

A rod 30 is pivotally connected to a bell crank lever 31 fulcrumed to the frame 1 and is pivotally connected to the lever 26 said bell crank lever being also pivotally connected to the depending link 32 pivoted at its lower end to the conveyer, or platform 8 whereby the platform carrying the sickle bar and the wheel with radial wings may be elevated and lowered.

A suitable rake 18 is pivoted at the rear of the frame, affording means for raking up vines. A suitable seat 20 is mounted upon the rear axle and a tongue 27 is secured to the forward axle to which tongue power may be applied.

What I claim to be new is:

A peanut harvester, comprising a frame having forward and rear axles, wheels rotating with the latter, a platform having arms fastened to its rear end and pivotally mounted upon the rear axle and adapted to carry a sickle bar, said platform being disposed at an inclination, bracket arms projecting from the forward end of the platform, a shaft journaled in bearings at the upper ends of said bracket arms, a wheel having radial wings rotating with said shaft, a rod connected to one of said bracket arms and a pivotal lever at its other end, and affording means for raising and lowering the platform and wheel carried thereby.

THOMAS J. GOODRUM.

Witness:
LAURA L. GOODRUM.